United States Patent
Nakahama et al.

(10) Patent No.: US 8,262,790 B2
(45) Date of Patent: Sep. 11, 2012

(54) COLORED PARTICLES

(75) Inventors: Kazumichi Nakahama, Tokyo (JP);
Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/842,920

(22) Filed: Jul. 23, 2010

(65) Prior Publication Data

US 2011/0023749 A1     Feb. 3, 2011

(30) Foreign Application Priority Data

Jul. 30, 2009  (JP) .................. 2009-178013

(51) Int. Cl.
*C09D 11/00*   (2006.01)
*C09B 63/00*   (2006.01)

(52) U.S. Cl. .................. 106/31.65; 106/402

(58) Field of Classification Search ............. 106/31.65, 106/402
See application file for complete search history.

(56) References Cited

U.S. PATENT DOCUMENTS

| | | | |
|---|---|---|---|
| 4,167,422 A * | 9/1979 | Bellanca et al. | 106/402 |
| 4,769,079 A * | 9/1988 | Clark et al. | 106/402 |
| 5,318,627 A | 6/1994 | Dietz | |
| 5,859,237 A | 1/1999 | Noguchi | |
| 5,882,394 A * | 3/1999 | Sugamo et al. | 106/402 |
| 2002/0025994 A1 * | 2/2002 | Ishizuka et al. | 523/160 |
| 2003/0193554 A1 * | 10/2003 | Bullock et al. | 347/100 |
| 2005/0261395 A1 * | 11/2005 | Ishizuka et al. | 523/160 |
| 2006/0167136 A1 * | 7/2006 | Kaneko et al. | 523/160 |
| 2007/0065743 A1 * | 3/2007 | Huang et al. | 430/108.2 |
| 2008/0036830 A1 * | 2/2008 | Natori et al. | 347/86 |
| 2011/0054094 A1 * | 3/2011 | Nakahama et al. | 524/186 |
| 2011/0239901 A1 * | 10/2011 | Koji et al. | 106/31.65 |

FOREIGN PATENT DOCUMENTS

| | | |
|---|---|---|
| JP | 05-112732 A | 5/1993 |
| JP | 08-302229 A | 11/1996 |

* cited by examiner

*Primary Examiner* — Melvin C Mayes
*Assistant Examiner* — Veronica F Faison
(74) *Attorney, Agent, or Firm* — Canon U.S.A., Inc., IP Division (57) ABSTRACT

The present invention relates to colored particles containing a dye and a dispersant, wherein the average particle diameter of the colored particles is 10 nm or more, and 80 nm or less, the solubility index represented by Formula (1) of the dye is 9.20 or more, and the dye content and the dispersant content in the colored particles satisfy the relationship represented by Formula (2).

7 Claims, 2 Drawing Sheets

FIG. 2

COLORED PARTICLES

BACKGROUND OF THE INVENTION

1. Field of the Invention

The present invention relates to colored particles.

2. Description of the Related Art

In the case where an ink containing colored particles, e.g., pigments, are applied to a recording medium, if fine colored particles are employed, scattering of light on the recording medium due to the colored particles can be suppressed. Therefore, along with an increase in content of colored particles in an ink solution, an image density on the recording medium can be increased. Moreover, fine colored particles are easily densely filled into pores of an ink receiving layer and a support of the recording medium, so that physical interaction occurs between them and good scratch resistance is exhibited.

Examples of methods for producing fine colored particles in the related art include mechanical methods by using dispersing apparatuses, e.g., sand mills, roll mills, and ball mills (refer to Japanese Patent Laid-Open No. 05-112732 and Japanese Patent Laid-Open No. 08-302229).

SUMMARY OF THE INVENTION

Aspects of the present invention provide colored particles containing a dye and a dispersant, wherein the average particle diameter of the colored particles is 10 nm or more, and 80 nm or less, the solubility index represented by Formula (1), as described below, of the dye relative to water is 9.20 or more relative to any water having a pH of 6.0 to 11.0, and the dye content and the dispersant content of the colored particles satisfy the relationship represented by Formula (2), as described below:

$$\text{solubility index} = \log(1/(\text{solubility of dye in water(mol/L)}))  \quad \text{Formula (1)}$$

$$3/2 \leq (\text{dye content in colored particles})/(\text{dispersant content in colored particles}) \quad \text{Formula (2)}$$

wherein, the dye content in colored particles and the dispersant content in colored particles are on a mass basis.

Further features of the present invention will become apparent from the following description of exemplary embodiments with reference to the attached drawings.

DESCRIPTION OF THE EMBODIMENTS

As for the mechanical methods for reducing a fine particle size, as described in Japanese Patent Laid-Open Nos. 05-112732 and 08-302229, recoagulation of colored particles resulting from excessive dispersion occurs. Therefore, it is a limit of reduction in fine particle size that the particle diameter is reduced to about 90 nm. In addition, it may not be realistic from the viewpoint of the production cost to attempt to further reduce the fine particle size by these methods because a great deal of treatment time or treatment electric power is required. Moreover, mechanical reduction in fine particle size has a problem in that the monodispersibility is impaired.

According to aspects of the present invention, fine colored particles exhibiting good monodispersibility can be provided.

Aspects of the present invention relate to colored particles containing a dye and a dispersant, wherein the average particle diameter of the colored particles is 10 nm or more, and 80 nm or less, the solubility index represented by Formula (1), as described below, of the dye is 9.20 or more relative to any water having a pH of 6.0 to 11.0, and the dye content and the dispersant content in the colored particles satisfy the relationship represented by Formula (2), as described below:

$$\text{solubility index} = \log(1/(\text{solubility of dye in water(mol/L)})) \quad \text{Formula (1)}$$

$$3/2 \leq (\text{dye content in colored particles})/(\text{dispersant content in colored particles}) \quad \text{Formula (2)}$$

wherein, the dye content in colored particles and the dispersant content in colored particles are on a mass basis.

The colored particles according to aspects of the present invention have an average particle diameter of 10 nm or more, and 80 nm or less in the water. The average particle diameter may be 50 nm or less. In the case where this range is employed, scattering of light due to the colored particles can be suppressed and an image density can be increased in formation of an image on a recording medium. Furthermore, physical interaction with fine pores present in an ink receiving layer and a support occurs, so that the scratch resistance can be enhanced. On the other hand, if the average particle diameter is less than 10 nm, the light resistance and the gas resistance tend to become poor in formation of an image on a recording medium. If 80 nm is exceeded, the image density tends to be reduced because of scattering of light and the scratch resistance tends to be reduced in formation of an image on a recording medium. According to aspects of the present invention, the average particle diameter in the water is a value measured by a dynamic light scattering method. Examples of particle diameter measuring apparatuses on the basis of the dynamic light scattering method include DLS8000 (produced by OTSUKA ELECTRONICS CO., LTD.).

According to aspects of the present invention, the coefficient of variation in average particle diameter of the colored particles may be 60% or less. That is, the coefficient of variation may be 50% or less, and even 40% or less. If the coefficient of variation exceeds 60% in the case where a water-based ink is prepared, the dispersion stability may be reduced, and the storage stability and the ejection stability may be degraded. Moreover, if the coefficient of variation exceeds 60% in the case where an image is formed on the recording medium, the filling factor into pores of the ink receiving layer and the support is reduced, the interaction with them does not occur easily, and the scratch resistance tends to be degraded.

The coefficient of variation in average particle diameter of the colored particles according to aspects of the present invention is calculated on the basis of Formula (3), as described below, from the average particle diameter of the colored particles and the standard deviation thereof. The calculation of the coefficient of variation can be applied to each of the average particle diameters in the dry state and in the water.

$$\text{coefficient of variation (\%)} = ((\text{standard deviation of particle diameters of colored particles})/(\text{average particle diameter of colored particles})) \times 100 \quad \text{Formula (3)}$$

Furthermore, according to aspects of the present invention, the dye content and the dispersant content in the colored particles satisfy the relationship represented by Formula (2). In one case, (dye content in colored particles)/(dispersant content in colored particles) is 7/3 or more, and 9/1 or less. If the ratio is less than 3/2, the image density of a recorded image tends to become insufficient in the case where the colored particles are applied to the recording medium. This is because the dispersant substantially not contributing to color development is present excessively relative to the dye. If the ratio exceeds 9/1, in the case where a water-based ink is prepared, sufficient dispersion stability is sometimes not ensured.

According to aspects of the present invention, an average aspect ratio of the colored particles refers to an average aspect ratio (major axis/minor axis) on the basis of the number of colorant particles formed from dispersoids, that is, the dye, of the above-described colored particles. The average aspect ratio of the colored particles according to aspects of the present invention can be 1.0 or more, and 1.2 or less in such a way that the sphericity is enhanced. Such colored particles exhibit good fluidity in the case of being used as a water-based ink and, therefore, has an advantage in ejection characteristic. The average aspect ratio according to aspects of the present invention can be obtained by measuring 1,000 or more of major axes and minor axes of colorant particles on the basis of an image observed with a scanning electron microscope (SEM) or a transmission electron microscope (TEM) and calculating an average value thereof on a number average basis.

The dye contained in the colored particles according to aspects of the present invention is characterized in that the solubility index represented by Formula (1) relative to the water having a pH of 6.0 to 11.0 is 9.20 or more. Regarding the solubility index represented by Formula (1), as the value becomes small, the solubility of dye in water becomes high, and as the value becomes large, the solubility in water becomes low. The solubility index of dye in water may be changed depending on the pH of the water. In the production process of the colored particles according to aspects of the present invention, if the dye in the dispersoids is dissolved into a dispersion medium (a second liquid), the dye, which is dissolved into the water in a very small amount, has an influence on the dispersion stability of the colored particles, so that it becomes difficult to obtain fine colored particles exhibiting good monodispersibility. The second liquid according to aspects of the present invention is water and the pH thereof is within the range of 6.0 to 11.0 at the widest. Therefore, the solubility index of the dye is always 9.20 or more while the pH of the water is within the range of 6.0 to 11.0. That is, since the solubility index of the dye is 9.20 or more relative to any water having a pH of 6.0 to 11.0, colored particles can be formed stably.

The solubility index according to aspects of the present invention can be calculated by measuring the solubility (mol/L) of the dye in the water having a pH of 6.0 to 11.0 by a previously known experimental method and substituting the resulting value into Formula (1). The solubility index according to aspects of the present invention may be calculated by substituting the solubility (mol/L) of the dye in the water into Formula (1), where the solubility is calculated by ACD/Structure Design Suite (produced by Fujitsu Limited). The present inventors ascertained that the thus calculated solubility index was in good agreement with the experimental result. In this regard, as for metal complex colorants, salt-forming dyes, and the like, it is necessary to calculate the solubility in the state, in which the metals and salts are removed, by ACD/Structure Design Suite and calculate the solubility index on the basis of the resulting value.

Examples of dyes according to aspects of the present invention include disperse dyes, metal complex dyes, acid dyes, direct dyes, salt-forming dyes of reactive dyes and long chain amines, and dyes exhibiting oil solubility on the basis of salt formation of water-soluble dyes and long chain bases, insofar as the above-described contents are satisfied.

Furthermore, the colored particles according to aspects of the present invention may contain ultraviolet absorbers, antiseptics, and other additives as auxiliaries.

Next, a method for manufacturing colored particles according to aspects of the present invention will be described. The method for manufacturing colored particles according to aspects of the present invention includes the steps of emulsifying a mixed solution, in which a first liquid and a dye are mixed, and a second liquid so as to obtain a miniemulsion containing dispersoids (hereafter referred to as an emulsification step) and removing the first liquid from the dispersoids (hereafter referred to as a removal step). The solubility index represented by Formula (1), as described below, of the above-described dye relative to water is 9.20 or more relative to any water having a pH of 6.0 to 11.0, and the dye content and the dispersant content in the colored particles satisfy the relationship represented by Formula (2), as described below.

$$\text{solubility index} = \log(1/(\text{solubility of dye in water(mol/L)})) \quad \text{Formula (1)}$$

$$3/2 \leq (\text{dye content in colored particles})/(\text{dispersant content in colored particles}) \quad \text{Formula (2)}$$

Figure 1:
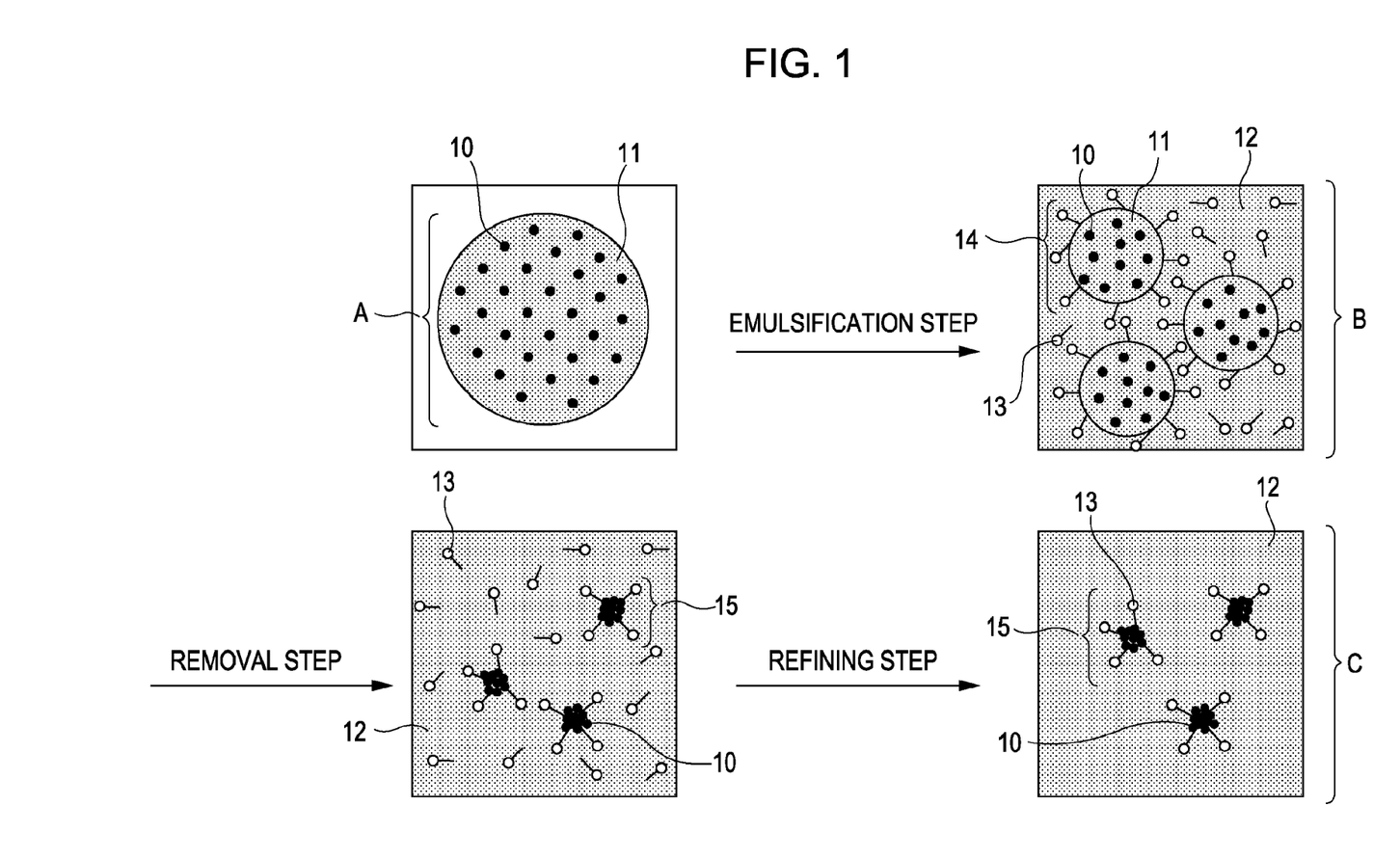
FIG. 1 is a diagram showing a method for manufacturing colored particles according to aspects of the present invention.

The method for manufacturing the colored particles according to aspects of the present invention will be described with reference to FIG. 1. In FIG. 1, a mixed solution A is a liquid prepared by mixing a dye 10 into a first liquid 11. At this time, the dye 10 may be dissolved in the liquid 11 from the viewpoint of production of desired colored particles. Then, in the emulsification step, the mixed solution A and a second liquid 12 are emulsified through the medium of a dispersant 13. In this manner, a miniemulsion B containing dispersoids 14 is produced. Regarding the dispersoids 14, the dye 10 and the first liquid 11 are dispersed in the second liquid 12 through the medium of the dispersant 13. Subsequently, in the removal step, the first liquid 11 is removed from the dispersoids 14 so as to form dispersoids 15. Regarding the dispersoids 15, the dye 10 is dispersed in the second liquid 12 through the medium of the dispersant 13. The dispersoids 15 are the colored particles according to aspects of the present invention.

According to aspects of the present invention, after the removal step, a refining step can be conducted, in which the dispersant and the like not participating in dispersion of the colored particles are removed through refining from a liquid composition composed of the colored particles and the second liquid 12. In this regard, in the refining step, impurities, e.g., evaporation residue, which may be generated in the removal step, can be removed through refining.

The first liquid according to aspects of the present invention is an organic solvent, which has little solubility in the second liquid according to aspects of the present invention and forms an interface when being mixed with the second liquid. It may be the case that the first liquid has such solubility that 3 percent by mass or less thereof dissolves into 97 percent by mass of second liquid at ambient temperature (20° C.). In the case where this condition is satisfied, a miniemulsion can be formed in the emulsification step. Furthermore, in the case where a volatile organic solvent having a boiling point lower than that of the second liquid is used as the first liquid, the first liquid can be removed from the dispersoids in the miniemulsion. Moreover, the first liquid can be an organic solvent, which dissolves 1 percent by mass or more of dye according to aspects of the present invention at ambient temperature (20° C.). Specific examples of organic solvents serving as the first liquid will be described below. Examples thereof include, but are not limited to, halogenated hydrocarbons (dichloromethane, chloroform, chloroethane, dichloroethane, trichloroethane, carbon tetrachloride, and the like), ketones (acetone, methyl ethyl ketone, methyl isobutyl ketone, and the like), ethers (tetrahydrofuran, ethyl ether, isobutyl ether, and the like), esters (ethyl acetate, butyl acetate, and the like), and aromatic hydrocarbons (benzene, toluene, xylene, and the like).

The second liquid according to aspects of the present invention is water. The water used as the second liquid has little solubility in the first liquid according to aspects of the present invention and can form an interface when being mixed with the first liquid. The water used as the second liquid may be water having a pH adjusted by a previously known acidic reagent (hydrochloric acid or the like) or basic reagent (potassium hydroxide or the like). The water used as the second liquid may be an aqueous solution containing a dispersant or a water-miscible organic solvent. In this case, it is necessary that the water content is 50 percent by mass or more. In the case where the second liquid satisfies the above-described condition, a miniemulsion can be formed in the emulsification step.

According to aspects of the present invention, for the purpose of maintaining the dispersion stability of the miniemulsion and the colored particles, at least one of the first liquid and the second liquid can contain a dispersant. As for the dispersant, in particular, a low-molecular weight dispersant having a molecular weight of 1,000 or less can be used. In the case where a high-molecular weight dispersant (hereafter referred to as a polymer dispersant) having a molecular weight exceeding 1,000 is used, the viscosity of at least one of the first liquid and the second liquid increases and, thereby, it becomes difficult to form a miniemulsion in the emulsification step. Furthermore, in general, the dispersion force of the polymer dispersant is smaller than that of the low-molecular weight dispersant. Therefore, large amounts of polymer dispersant is required for giving the same dispersion stability as that of the low-molecular weight dispersant to the miniemulsion and the desired colored particles. Consequently, it becomes difficult to satisfy Formula 2 specified according to aspects of the present invention and it becomes difficult to achieve a good image density. Furthermore, removal of polymer dispersant from the dispersoids is difficult, so that it becomes difficult to satisfy Formula 2. As for the low-molecular weight dispersant, previously known anionic dispersants, cationic dispersants, and nonionic dispersants can be used. Examples of anionic dispersants include, but are not limited to, dodecylbenzene sulfonate, decylbenzene sulfonate, undecylbenzene sulfonate, tridecylbenzene sulfonate, nonylbenzene sulfonate, sodium salts, potassium salts, and ammonium salts thereof, and sodium dodecyl sulfate. Examples of cationic dispersants include, but are not limited to, cetyl trimethyl ammonium bromide, hexadecylpyridinium chloride, and hexadecyl trimethyl ammonium chloride. Examples of nonionic dispersants include, but are not limited to, oxyethylene based alkyl ethers.

Figure 2:
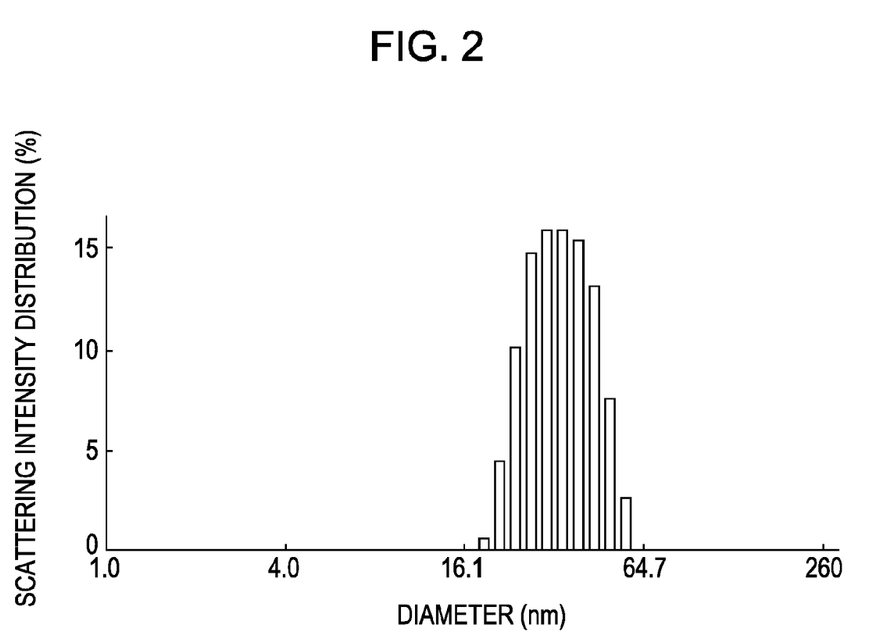
FIG. 2 is a diagram showing the particle diameter distribution of a miniemulsion according to aspects of the present invention.

The miniemulsion according to aspects of the present invention contains the mixed solution of the dye and the first liquid as dispersoids. Furthermore, as shown in FIG. 2, the miniemulsion according to aspects of the present invention has particle diameter distribution with substantially one peak. Since the particle diameter distribution has one peak, the monodispersibility of the desired colored particles is enhanced significantly. It may be the case that the average particle diameter of the dispersoids is 10 nm or more, and 1,000 nm or less on the basis of a dynamic light scattering method. According to aspects of the present invention, the first liquid, in which the dye has been dissolved, and the second liquid are emulsified so as to produce a miniemulsion, the dispersoids of the miniemulsion serve as templates and, thereafter, the first liquid is removed from the dispersoids, so as to obtain a desired dispersion. On the other hand, in the case where dispersoids of a common polydisperse emulsion or suspension serve as templates, it is difficult to obtain a desired dispersion, which is based on monodispersion of small diameter particles, according to aspects of the present invention.

According to aspects of the present invention, hydrophobes (hydrophobic substances), which can be dissolved in an oil-based solvent and which have a solubility of 0.01 g/L or less relative to a water-based solvent, can be contained in the oil-based solvent. The term "be dissolved in an oil-based solvent" refers to that the solubility is 3 percent by mass or more relative to 97 percent by mass of oil-based solvent at ambient temperature (20° C.). Consequently, the emulsion may be stabilized easily. Specific examples of hydrophobes include, but are not limited to, straight-chain, branched-chain, or circular alkanes having the carbon number of 8 or more, and 30 or less, e.g., hexadecane, squalane, and cyclooctane, alkyl acrylates having the carbon number of 8 or more, and 30 or less, e.g., stearyl methacrylate and dodecyl methacrylate, alkyl alcohols having the carbon number of 8 or more, and 30 or less, e.g., cetyl alcohol, alkyl thiols having the carbon number of 8 or more, and 30 or less, e.g., decyl mercaptan, polymers, e.g., polyurethanes, polyesters, and polystyrenes, long-chain fatty or aromatic carboxylic acids, long-chain fatty or aromatic carboxylic acid esters, long-chain fatty or aromatic amine, ketone, halogenated alkane, silane, siloxane, and isocyanate. In one case, alkanes having the carbon number of 12 or more, and 20 or less, may be provided.

In the case where a hydrophobic dye having a solubility index represented by Formula (1) of 9.20 or more is used, as in embodiments according to the present invention, a stable miniemulsion can be formed. It is believed that the dye having a solubility index of 9.20 or more according to aspects of the present invention stabilizes the miniemulsion on the basis of the same mechanism as that of the hydrophobe and contributes to enhancement of monodispersibility of the desired colored particles.

In the emulsification step according to aspects of the present invention, previously known emulsification methods, e.g., a high-shear homomixer, an ultrasonic homogenizer, a high-pressure homogenizer, and a thin-film rotation high-speed mixer, based on the impartation of mechanical energy can be applied. In one case, at least one of an ultrasonic homogenizer, a high-pressure homogenizer, and a thin-film rotation high-speed mixer may be applied. Furthermore, the miniemulsion according to aspects of the present invention is also produced by emulsification methods based on a surface-chemical mechanism, e.g., membrane emulsification through the use of a SPG membrane and microreactors in a microchannel emulsification method, a branching microchannel emulsification method, and the like. These methods may be used alone or at least two of them may be used in combination. Moreover, the miniemulsion according to aspects of the present invention may be prepared through one stage of emulsification or be prepared through a plurality of stages of emulsification.

Any known method can be applied to the operation of removing the first liquid in the removal step according to aspects of the present invention. However, at least one of a reduced pressure operation and a dialysis operation can be applied from the viewpoint of throughput. In the case where the reduced pressure operation is applied to the removal step, a volatile organic solvent is suitable for the organic solvent. In the above-described reduced pressure operation, previously known reduced pressure apparatuses, such as an evaporator, can be used. In the case where the dialysis operation is applied to the removal step, previously known dialysis apparatuses, such as an ultrafilter, can be used besides a static dialysis method by using a semipermeable membrane.

In a phase-inversion emulsification method of a type, which is a common method for manufacturing colored particles and in which a polymer dispersant is used, the dispersant is distributed to the surfaces and the insides of the colored particles. On the other hand, in a manufacturing method according to aspects of the present invention, the dispersant is distributed to substantially only the surfaces of the colored particles. Therefore, in the manufacturing method according to aspects of the present invention, as indicated by Formula (2), the dye content in the colored particles can be larger than the dispersant content in the colored particles.

According to aspects of the present invention, after the step to remove the first liquid, the refining step to remove impurities, e.g., evaporation residue, which is generated because of the reduced pressure operation, and excess dispersant may be further conducted. As for the refining step, any previously known method can be applied. However, a static dialysis method by using a semipermeable membrane and a dialysis operation through the use of dialysis apparatuses, such as an ultrafilter, are applied. In the case where the dialysis operation is applied to the above-described removal step, the removal step and the refining step may be conducted at the same time.

EXAMPLES

The examples of colored particles and methods for manufacturing thereof according to aspects of the present invention will be described below, although aspects of the present invention are not limited to these examples. In this regard, in the examples, each of the terms "part" and "%" is on a mass basis.

Example 1

A mixed solution, in which Dye 1 described below was dissolved, was obtained by adding 5.0 g of Dye 1 to 97.5 g of chloroform, followed by mixing. The resulting mixed solution was added to 400 g of water (6.0 g of sodium dodecyl sulfate was contained, and the pH was adjusted to being 6.0 with hydrochloric acid). Furthermore, an emulsification treatment was conducted at 4° C. for 20 minutes with an ultrasonic homogenizer (200 W), so as to form an emulsion. The solubility index of Dye 1 was 9.28 relative to the water having a pH of 6.0. Moreover, the solubility index of Dye 1 was 9.20 or more relative to any water having a pH of 6.0 to 11.0. The resulting emulsion was a miniemulsion exhibiting particle diameter distribution with one peak and including dispersoids having an average particle diameter of 650 nm on the basis of the evaluation with DLS8000 (produced by OTSUKA ELECTRONICS CO., LTD.).

Subsequently, chloroform was removed from the above-described dispersoids by reducing the pressure with an evaporator, and refining was further conducted through dialysis. Thereafter, dispersion into distilled water was effected again so as to obtain desired Colored particles 1. The resulting Colored particles 1 were evaluated with DLS8000 (produced by OTSUKA ELECTRONICS CO., LTD.). As a result, the particle diameter distribution had one peak, the average particle diameter was 48 nm, and the coefficient of variation was 56%. Moreover, the average aspect ratio was 1.2 on the basis of observation with a transmission electron microscope.

Then, colorant particles were dried and solidified by freeze-drying Colored particles 1 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 1 adjusted to having a predetermined concentration and, thereby, the ratio of the content of Dye 1 in Colored particles 1 to the content of sodium dodecyl sulfate serving as a dispersant was measured.

The result was (content of Dye 1 in Colored particles 1)/(content of dispersant in Colored particles 1)=71/29 and, therefore, the value was larger than 3/2.

Dye 1

Example 2

A mixed solution, in which Dye 2 described below was dissolved, was obtained by adding 5.0 g of Dye 2 to 97.5 g of chloroform, followed by mixing. The resulting mixed solution was added to 400 g of water (6.0 g of sodium dodecyl sulfate was contained, and the pH was adjusted to being 6.0 with hydrochloric acid). Furthermore, an emulsification treatment was conducted at 4° C. for 20 minutes with an ultrasonic homogenizer (200 W), so as to form an emulsion. The solubility index of Dye 2 was 9.55 relative to the water having a pH of 6.0. Moreover, the solubility index of Dye 2 was 9.20 or more relative to any water having a pH of 6.0 to 11.0. The resulting emulsion was a miniemulsion exhibiting particle diameter distribution with one peak and including dispersoids having an average particle diameter of 630 nm on the basis of the evaluation with DLS8000 (produced by OTSUKA ELECTRONICS CO., LTD.).

Subsequently, chloroform was removed from the above-described dispersoids by reducing the pressure with an evaporator, and refining was further conducted through ultrafiltration. Thereafter, dispersion into distilled water was effected again so as to obtain desired Colored particles 2. The resulting Colored particles 2 were evaluated with DLS8000 (produced by OTSUKA ELECTRONICS CO., LTD.). As a result, the particle diameter distribution had one peak, the average particle diameter was 43 nm, and the coefficient of variation was 49%. Moreover, the average aspect ratio was 1.17 on the basis of observation with a transmission electron microscope.

Then, colorant particles were dried and solidified by freeze-drying Colored particles 2 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 2 adjusted to having a predetermined concentration and, thereby, the ratio of the content of Dye 2 in Colored particles 2 to the content of sodium dodecyl sulfate serving as a dispersant was measured.

The result was

(content of Dye 2 in Colored particles 2)/(content of dispersant in Colored particles 2)=65/35 and, therefore, the value was larger than 3/2.

ticle diameter was 76 nm, and the coefficient of variation was 58%. Moreover, the average aspect ratio was 1.13 on the basis of observation with a transmission electron microscope.

Then, colorant particles were dried and solidified by freeze-drying Colored particles 3 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 3 adjusted to having a predetermined concentration and, thereby, the ratio of the content of Dye 3 in Colored particles 3 to the content of sodium dodecyl sulfate serving as a dispersant was measured.

The result was (content of Dye 3 in Colored particles 3)/(content of dispersant in Colored particles 3)=73/27 and, therefore, the value was larger than 3/2.

Dye 2

Dye 3

Example 3

A mixed solution, in which Dye 3 described below was dissolved, was obtained by adding 7.0 g of Solvent Blue 97 (Dye 3) to 97.5 g of chloroform, followed by mixing. The resulting mixed solution was added to 400 g of water (6.0 g of sodium dodecyl sulfate was contained, and the pH was adjusted to being 6.0 with hydrochloric acid). Furthermore, an emulsification treatment was conducted at 4° C. for 20 minutes with an ultrasonic homogenizer (200 W), so as to form an emulsion. The solubility index of Dye 3 was 12.06 relative to the water having a pH of 6.0. Moreover, the solubility index of Dye 3 was 9.20 or more relative to any water having a pH of 6.0 to 11.0. The resulting emulsion was a miniemulsion exhibiting particle diameter distribution with one peak and including dispersoids having an average particle diameter of 810 nm on the basis of the evaluation with DLS8000 (produced by OTSUKA ELECTRONICS CO., LTD.).

Subsequently, chloroform was removed from the above-described dispersoids by reducing the pressure with an evaporator, and refining was further conducted through ultrafiltration. Thereafter, dispersion into distilled water was effected again so as to obtain desired Colored particles 3. The resulting Colored particles 3 were evaluated with DLS8000 (produced by OTSUKA ELECTRONICS CO., LTD.). As a result, the particle diameter distribution had one peak, the average par- Example 4

A mixed solution, in which Dye 3 was dissolved, was obtained by adding 0.5 g of Solvent Blue 97 (Dye 3) to 0.95 g of chloroform, followed by mixing. The resulting mixed solution was added to 4 g of water (0.8 g of sodium dodecyl sulfate was contained, and the pH was adjusted to being 6.0 with hydrochloric acid). Furthermore, an emulsification treatment was conducted at 4° C. for 10 minutes with an ultrasonic homogenizer (200 W), so as to form an emulsion. The solubility index of Dye 3 was 12.06 relative to the water having a pH of 6.0, as described above. The resulting emulsion was a miniemulsion exhibiting particle diameter distribution with one peak and including dispersoids having an average particle diameter of 142 nm on the basis of the evaluation with DLS8000 (produced by OTSUKA ELECTRONICS CO., LTD.).

Subsequently, chloroform was removed from the above-described dispersoids by reducing the pressure with an evaporator, and refining was further conducted through ultrafiltration. Thereafter, dispersion into distilled water was effected again so as to obtain desired Colored particles 4. The resulting Colored particles 4 were evaluated with DLS8000 (produced by OTSUKA ELECTRONICS CO., LTD.). As a result, the particle diameter distribution had one peak, the average particle diameter was 12 nm, and the coefficient of variation was 59%. Moreover, the average aspect ratio was 1.10 on the basis of observation with a transmission electron microscope.

Then, Colored particles 4, as described above, were dried and solidified by being freeze-dried. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 3 adjusted to having a predetermined concentration and, thereby, the ratio of the content of Dye 3 in Colored particles 4 to the content of sodium dodecyl sulfate serving as a dispersant was measured.

The result was (content of Dye 3 in Colored particles 4)/(content of dispersant in Colored particles 4)=65/41 and, therefore, the value was larger than 3/2.

Example 5

A mixed solution, in which Dye 3 was dissolved, was obtained by adding 7.0 g of Solvent Blue 97 (Dye 3) to 97.5 g of chloroform, followed by mixing. The resulting mixed solution was added to 400 g of water (7.0 g of sodium dodecyl sulfate was contained, and the pH was adjusted to being 6.0 with hydrochloric acid). Furthermore, an emulsification treatment was conducted at 4° C. for 20 minutes with an ultrasonic homogenizer (200 W), so as to form an emulsion. The solubility index of Dye 3 was 12.06 relative to the water having a pH of 6.0, as described above. The resulting emulsion was a miniemulsion exhibiting particle diameter distribution with one peak and including dispersoids having an average particle diameter of 770 nm on the basis of the evaluation with DLS8000 (produced by OTSUKA ELECTRONICS CO., LTD.).

Subsequently, chloroform was removed from the above-described dispersoids by reducing the pressure with an evaporator, and refining was further conducted through ultrafiltration. Thereafter, dispersion into distilled water was effected again so as to obtain desired Colored particles 5. The resulting Colored particles 5 were evaluated with DLS8000 (produced by OTSUKA ELECTRONICS CO., LTD.). As a result, the particle diameter distribution had one peak, the average particle diameter was 45 nm, and the coefficient of variation was 52%. Moreover, the average aspect ratio was 1.10 on the basis of observation with a transmission electron microscope.

Then, colorant particles were dried and solidified by freeze-drying Colored particles 5 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 3 adjusted to having a predetermined concentration and, thereby, the ratio of the content of Dye 3 in Colored particles 5 to the content of sodium dodecyl sulfate serving as a dispersant was measured.

The result was (content of Dye 3 in Colored particles 5)/(content of dispersant in Colored particles 5)=3/1 and, therefore, the value was larger than 3/2.

Comparative Example 1

A mixed solution, in which Dye 4 described below was dissolved, was obtained by adding 5.0 g of Dye 4 to 97.5 g of chloroform, followed by mixing. The resulting mixed solution was added to 400 g of water (6.0 g of sodium dodecyl sulfate was contained, and the pH was adjusted to being 6.0 with hydrochloric acid). Furthermore, an emulsification treatment was conducted at 4° C. for 20 minutes with an ultrasonic homogenizer (200 W), so as to form an emulsion. The solubility index of Dye 4 was 9.10 relative to the water having a pH of 6.0. The resulting emulsion was a miniemulsion exhibiting particle diameter distribution with one peak and including dispersoids having an average particle diameter of 720 nm on the basis of the evaluation with DLS8000 (produced by OTSUKA ELECTRONICS CO., LTD.).

Subsequently, chloroform was removed from the above-described dispersoids by reducing the pressure with an evaporator, and preservation was conducted for 24 hours with agitation. As a result, coagulation and precipitation occurred and colored particles were not able to be dispersed again.

Dye 4

Comparative Example 2

A mixed solution, in which Dye 5 was dissolved, was obtained by adding 5.0 g of Solvent Blue 35 (Dye 5) to 97.5 g of chloroform, followed by mixing. The resulting mixed solution was added to 400 g of water (6.0 g of sodium dodecyl sulfate was contained, and the pH was adjusted to being 11.0 with potassium hydroxide). Furthermore, an emulsification treatment was conducted at 4° C. for 20 minutes with an ultrasonic homogenizer (200 W), so as to form an emulsion. The solubility index of Dye 5 was 8.16 relative to the water having a pH of 11.0. The resulting emulsion was a miniemulsion exhibiting particle diameter distribution with one peak and including dispersoids having an average particle diameter of 690 nm on the basis of the evaluation with DLS8000 (produced by OTSUKA ELECTRONICS CO., LTD.).

Subsequently, chloroform was removed from the above-described dispersoids by reducing the pressure with an evaporator, and preservation was conducted for 24 hours with agitation. As a result, coagulation and precipitation occurred and colored particles were not able to be dispersed again.

Comparative Example 3

In Example 3, sodium dodecyl sulfate serving as the dispersant was added in such a way that the resulting colorant particles satisfied (dye content in colored particles)/(dispersant content in colored particles)=6/7. Colored particles 6 were obtained in a manner similar to that in Example 3 except the above-described condition.

Comparative Example 4

A mixed solution, in which Dye 3 was dissolved, was obtained by adding 5.0 g of Solvent Blue 97 (Dye 3) to 97.5 g of chloroform, followed by mixing. The resulting mixed solution was added to 400 g of water (1.0 g of sodium dodecyl sulfate was contained, and the pH was adjusted to being 6.0 with hydrochloric acid). Furthermore, an emulsification treatment was conducted at 4° C. for 20 minutes with an ultrasonic homogenizer (200 W), so as to form an emulsion. The solubility index of Dye 3 was 12.06 relative to the water having a pH of 6.0, as described above. However, the resulting emulsion exhibited particle diameter distribution with a plurality of peaks and, therefore, was not a miniemulsion on the basis of the evaluation with DLS8000 (produced by OTSUKA ELECTRONICS CO., LTD.). Regarding this emulsion, the dispersoids exhibited poor dispersion stability and an average particle diameter was not able to be determined.

Subsequently, chloroform was removed from the above-described dispersoids by reducing the pressure with an evaporator, and refining was further conducted through ultrafiltration. Thereafter, dispersion into distilled water was effected again. Consequently, dispersed materials and coagulated materials were obtained at the same time. Then, the coagulated materials were removed with a filter so as to isolate the dispersed materials and, thereby, obtain Colored particles 7. The resulting Colored particles 7 were evaluated with DLS8000 (produced by OTSUKA ELECTRONICS CO., LTD.). As a result, the particle diameter distribution had one peak, although the peak was broad, the average particle diameter was 96 nm, and the coefficient of variation was 62%. Moreover, the average aspect ratio was 1.15 on the basis of observation with a transmission electron microscope.

Next, colorant particles were dried and solidified by freeze-drying Colored particles 7 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 3 adjusted to having a predetermined concentration and, thereby, the ratio of the content of Dye 3 in Colored particles 7 to the content of sodium dodecyl sulfate serving as a dispersant was measured.

The result was (content of Dye 3 in Colored particles 7)/(content of dispersant in Colored particles 7)=39/11.

Comparative Example 5

A mixed solution, in which Dye 3 and a styrene-acrylic acid copolymer were dissolved in chloroform, was obtained by adding 1.0 g of Solvent Blue 97 (Dye 3) and 4.0 g of styrene-acrylic acid copolymer (weight average molecular weight: 5,000, acid value: 180 mg·KOH/g) to 97.5 g of chloroform, followed by mixing. The resulting mixed solution was added to water (the pH was adjusted to being 11.0 with potassium hydroxide). Furthermore, an emulsification treatment was conducted at 4° C. for 20 minutes with an ultrasonic homogenizer (200 W), so as to form an emulsion. The solubility index of Dye 3 was 12.06 relative to the water having a pH of 11.0. The resulting emulsion was a miniemulsion exhibiting particle diameter distribution with one peak and including dispersoids having an average particle diameter of 790 nm on the basis of the evaluation with DLS8000 (produced by OTSUKA ELECTRONICS CO., LTD.).

Subsequently, chloroform was removed from the above-described dispersoids by reducing the pressure with an evaporator, and refining was further conducted through ultrafiltration. Thereafter, dispersion into distilled water was effected again so as to obtain desired Colored particles 8. The resulting Colored particles 8 were evaluated with DLS8000 (produced by OTSUKA ELECTRONICS CO., LTD.). As a result, the particle diameter distribution had one peak, the average particle diameter was 72 nm, and the coefficient of variation was 59%. Moreover, the average aspect ratio was 1.12 on the basis of observation with a transmission electron microscope.

Then, colorant particles were dried and solidified by freeze-drying Colored particles 8 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 3 adjusted to having a predetermined concentration and, thereby, the ratio of the content of Dye 3 in Colored particles 8 to the content of styrene-acrylic acid copolymer serving as a dispersant was measured.

The result was (content of Dye 3 in Colored particles 8)/(content of dispersant in Colored particles 8)=11/43 and, therefore, the value was larger than 3/2.

Comparative Example 6

A mixed solution, in which Dye 3 and a styrene-acrylic acid copolymer were dissolved in chloroform, was obtained by adding 3.1 g of Solvent Blue 97 (Dye 3) and 1.9 g of styrene-acrylic acid copolymer (weight average molecular weight: 5,000, acid value: 180 mg·KOH/g) to 97.5 g of chloroform, followed by mixing. The resulting mixed solution was added to water (the pH was adjusted to being 11.0 with potassium hydroxide). Furthermore, an emulsification treatment was conducted at 4° C. for 20 minutes with an ultrasonic homogenizer (200 W), so as to form an emulsion. The solubility index of Dye 3 was 12.06 relative to the water having a pH of 11.0, as described above. However, the resulting emulsion exhibited particle diameter distribution with a plurality of peaks and, therefore, was not a miniemulsion on the basis of the evaluation with DLS8000 (produced by OTSUKA ELECTRONICS CO., LTD.). Regarding this emulsion, the dispersoids exhibited poor dispersion stability and an average particle diameter was not able to be determined.

Subsequently, chloroform was removed from the above-described dispersoids by reducing the pressure with an evaporator, and refining was further conducted through ultrafiltration. Thereafter, dispersion into distilled water was effected again. Consequently, dispersed materials and coagulated materials were obtained at the same time. Then, the coagulated materials were removed with a filter so as to isolate the dispersed materials and, thereby, obtain Colored particles 9. The resulting Colored particles 9 were evaluated with DLS8000 (produced by OTSUKA ELECTRONICS CO., LTD.). As a result, the particle diameter distribution had one peak, although the peak was broad, the average particle diameter was 162 nm, and the coefficient of variation was 68%. Moreover, the average aspect ratio was 1.17 on the basis of observation with a transmission electron microscope.

Next, colorant particles were dried and solidified by freeze-drying Colored particles 9 described above. Furthermore, dissolution into chloroform was conducted and, thereafter, a maximum absorption wavelength and the light-absorption intensity thereof were evaluated on the basis of an absorbance measurement. The above-described light-absorption intensity was compared with a calibration curve determined on the basis of the absorbance measurement of the chloroform solution of Dye 3 adjusted to having a predetermined concentration and, thereby, the ratio of the content of Dye 3 in Colored particles 9 to the content of styrene-acrylic acid copolymer serving as a dispersant was measured.

The result was (content of Dye 3 in Colored particles 9)/(content of dispersant in Colored particles 9)=30/19.

The results of Examples and Comparative examples, as described above, are collectively shown in Table 1.

TABLE 1

| | Colored particles | Dye solubility index | Dispersoids average particle diameter (nm) | Colored particles average particle diameter (nm) | Dye/dispersant |
|---|---|---|---|---|---|
| Example 1 | 1 | 9.28 | 650 | 48 | 71/29 |
| Example 2 | 2 | 9.55 | 630 | 43 | 65/35 |
| Example 3 | 3 | 12.06 | 810 | 76 | 73/27 |
| Example 4 | 4 | 12.06 | 142 | 12 | 64/41 |
| Example 5 | 5 | 12.06 | 770 | 45 | 3/1 |
| Comparative example 1 | — | 9.10 | 720 | — | — |
| Comparative example 2 | — | 8.16 | 690 | — | — |
| Comparative example 3 | 6 | 12.06 | 810 | 76 | 6/7 |
| Comparative example 4 | 7 | 12.06 | — | 96 | 39/11 |
| Comparative example 5 | 8 | 12.06 | 790 | 72 | 11/43 |
| Comparative example 6 | 9 | 12.06 | — | 162 | 30/19 |

Image Density Evaluation

Colored particles 6 were added to an aqueous solution containing water and glycerin, so as to prepare Ink composition 1 having a dye content of 5.0% and a glycerin content of 10.0%. Furthermore, Colored particles 3 were added to an aqueous solution containing water and glycerin, so as to prepare Ink composition 2 having a dye content of 5.0% and a glycerin content of 10.0%.

Ink compositions 1 and 2 were used, printed images were formed on a recording medium (Office Planner produced by CANON KABUSHIKI KAISHA) with a piezo inkjet printer (PX-V630, produced by SEIKO EPSON CORPORATION), and the printed image was evaluated visually. As a result, the printed image formed by Ink composition 2 was apparently clear and had a high image density as compared with the printed image formed by the Ink composition 1.

Scratch Resistance Evaluation

Colored particles 3, Colored particles 5, and Colored particles 7 were added individually to aqueous solutions containing water and glycerin in such a way that the dye content became 5.0% and the glycerin content became 20.0%, so as to prepare Ink composition 3, Ink composition 4, and Ink composition 5, respectively.

Ink compositions 3, 4, and 5 were used and printed images were formed on a recording medium (Office Planner produced by CANON KABUSHIKI KAISHA) with a piezo inkjet printer (PX-V630, produced by SEIKO EPSON CORPORATION). Each of the resulting printed images was stood for one day at room temperature and, thereafter, the printed image was rubbed with a finger in such a way that the load was about 50 g (rubbing). Subsequently, each printed image was observed visually to evaluate the scratch resistance. The evaluation criteria of the scratch resistance were as described below.

A: Tailing did not occur on the surface of the image.
B: Tailing occurred on the surface of the image slightly, but the colorant did not come off the recording medium.
C: Tailing remained on the surface of the image, and the colorant came off the recording medium slightly.

The results thereof are shown in Table 2 collectively.

TABLE 2

| | Colored particles | Colored particles average particle diameter (nm) | Scratch resistance |
|---|---|---|---|
| Ink composition 3 | 3 | 76 | B |
| Ink composition 4 | 5 | 45 | A |
| Ink composition 5 | 7 | 96 | C |

It was ascertained that the scratch resistance of the printed image depended on the average particle diameter of the colored particles, good scratch resistance was exhibited in the case of 80 nm or less, and particularly good scratch resistance was exhibited in the case of 50 nm or less.

According to the aspects of the present invention, fine colored particles exhibiting good monodispersibility can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-178013 filed Jul. 30, 2009, which is hereby incorporated by reference herein in its entirety.

What is claimed is:

1. Colored particles comprising a dye and a dispersant,
   wherein the average particle diameter of the colored particles is 10 nm or more, and 80 nm or less,
   the dispersant is selected from the group consisting of dodecylbenzene sulfonate, decylbenzene sulfonate, undecylbenzene sulfonate, tridecylbenzene sulfonate, nonylbenzene sulfonate, sodium salts, potassium salts, and ammonium salts thereof, sodium dodecyl sulfate, cetyl trimethyl ammonium bromide, hexadecylpyridinium chloride, hexadecyl trimethyl ammonium chloride, and oxyethylene based alkyl ethers,
   the solubility index represented by Formula (1), as described below, of the dye relative to water is 9.20 or more relative to any water having a pH of 6.0 to 11.0, and
   the dye content and the dispersant content in the colored particles satisfy the relationship represented by Formula (2), as described below:

solubility index=log(1/(solubility of dye in water (mol/L)))     Formula (1)

$3/2 \leq$ (dye content in colored particles)/(dispersant content in colored particles)     Formula (2)

wherein, the dye content in colored particles and the dispersant content in colored particles are on a mass basis.

2. The colored particles according to claim 1, wherein the coefficient of variation in average particle diameter of the colored particles is 60% or less.

3. The colored particles according to claim 1, wherein the average aspect ratio of the colored particles is 1.0 or more, and 1.2 or less.

4. An ink composition comprising the colored particles according to claim 1.

5. An ink composition comprising the colored particles according to claim 2.

6. An ink composition comprising the colored particles according to claim 3.

7. A method for manufacturing colored particles containing a dye and a dispersant, the method comprising the steps of:

emulsifying a mixed solution, in which a first liquid and a dye are mixed, and a second liquid so as to obtain a miniemulsion containing dispersoids; and removing the first liquid from the dispersoids, wherein the dispersant is selected from the group consisting of dodecylbenzene sulfonate, decylbenzene sulfonate, undecylbenzene sulfonate, tridecylbenzene sulfonate, nonylbenzene sulfonate, sodium salts, potassium salts, and ammonium salts thereof, sodium dodecyl sulfate, cetyl trimethyl ammonium bromide, hexadecylpyridinium chloride, hexadecyl trimethyl ammonium chloride, and oxyethylene based alkyl ethers, wherein the solubility index represented by Formula (1), as described below, of the dye relative to water is 9.20 or more relative to any water having a pH of 6.0 to 11.0, and the dye content and the dispersant content in the colored particles satisfy the relationship represented by Formula (2), as described below:

$$\text{solubility index} = \log(1/(\text{solubility of dye in water (mol/L)})) \quad \text{Formula (1)}$$

$$3/2 \leq (\text{dye content in colored particles})/(\text{dispersant content in colored particles}) \quad \text{Formula (2)}$$

wherein, the dye content in colored particles and the dispersant content in colored particles are on a mass basis.

* * * * *